United States Patent
Guo et al.

(10) Patent No.: US 9,326,100 B2
(45) Date of Patent: Apr. 26, 2016

(54) SIMPLE AND RELIABLE HOME LOCATION IDENTIFICATION METHOD AND APPARATUS

(71) Applicant: Continental Automotive Systems, Inc., Auburn Hills, MI (US)

(72) Inventors: Youliang Guo, Barrington, IL (US); John Borak, Cary, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 303 days.

(21) Appl. No.: 13/932,209

(22) Filed: Jul. 1, 2013

(65) Prior Publication Data
US 2015/0002310 A1  Jan. 1, 2015

(51) Int. Cl.
| | |
|---|---|
| *G08G 1/00* | (2006.01) |
| *H04W 4/02* | (2009.01) |
| *H04L 29/08* | (2006.01) |
| *H04W 4/00* | (2009.01) |
| *H04W 4/04* | (2009.01) |
| *G07C 9/00* | (2006.01) |
| *H04L 12/28* | (2006.01) |
| *H04W 64/00* | (2009.01) |

(52) U.S. Cl.
CPC ............ *H04W 4/023* (2013.01); *H04L 67/125* (2013.01); *H04W 4/008* (2013.01); *H04W 4/046* (2013.01); *G07C 2009/00865* (2013.01); *G07C 2009/00928* (2013.01); *H04L 12/282* (2013.01); *H04W 64/006* (2013.01)

(58) Field of Classification Search
None
See application file for complete search history.

(56) References Cited

U.S. PATENT DOCUMENTS

| | | | | |
|---|---|---|---|---|
| 7,398,077 | B1 * | 7/2008 | Rao | 455/410 |
| 8,674,845 | B2 * | 3/2014 | Carter et al. | 340/686.6 |
| 2006/0017565 | A1 * | 1/2006 | Addy | 340/539.14 |
| 2011/0082620 | A1 * | 4/2011 | Small et al. | 701/29 |

FOREIGN PATENT DOCUMENTS

| | | |
|---|---|---|
| EP | 2305505 A3 | 8/2011 |
| WO | 2008/045836 A3 | 4/2008 |
| WO | 2012/103394 A1 | 8/2012 |

OTHER PUBLICATIONS

Search Report dated Jan. 29, 2014, from corresponding GB Patent Application No. GB1315534.6.

* cited by examiner

*Primary Examiner* — Fekadeselassie Girma
*Assistant Examiner* — Thomas McCormack

(57) ABSTRACT

A method of detecting a home location first determines a location of a vehicle using either a WI-FI signal or a navigation system. A distance between the vehicle and the home location is determined followed by determining whether the distance between the vehicle and the home location is greater than a transmission range of a wireless device controller. If the distance between the location of the vehicle and the home location is less than the transmission range of the wireless device controller, an indication is provided in the vehicle to a vehicle occupant that the wireless device controller is within its transmission range of the home location.

6 Claims, 5 Drawing Sheets

SIMPLE AND RELIABLE HOME LOCATION IDENTIFICATION METHOD AND APPARATUS

BACKGROUND

Automobiles currently being manufactured are equipped with so many devices and systems that require a driver's attention that a driver can easily be distracted or even disoriented, especially at night. Some individuals might also find the large number and different types and shapes of the various controls in or around a vehicle's dashboard to be confusing to the point of being overwhelming. Many drivers might appreciate receiving timely assistance locating a control or input for a vehicle device, feature or system.

A built-in garage door opener is one device that many driver's use at least twice each day. Many vehicles are now provided with universal openers that have multiple push buttons by which multiple different doors or gates can be operated. Helping a driver timely find a garage door opener in a vehicle, especially at night, would be an improvement over the prior art.

BRIEF SUMMARY

In accordance with embodiments of the invention, a method of detecting a home location first determines a location of a vehicle using either a WI-FI signal or a navigation system. A distance between the vehicle and the home location is determined followed by determining whether the distance between the vehicle and the home location is greater than a transmission range of a wireless device controller. If the distance between the location of the vehicle and the home location is less than the transmission range of the wireless device controller, an indication is provided in the vehicle to a vehicle occupant that the wireless device controller is within its transmission range of the home location.

DETAILED DESCRIPTION

The methods and apparatus disclosed herein assist a vehicle's driver by automatically activating an indicator for a control device, typically a garage door opener button, when the vehicle is determined to be close to a predetermined home location for the vehicle. In one embodiment, the vehicle's location is determined using the detection of a signal broadcast from a wireless local area network (WLAN) access point (AP). In a second embodiment, the vehicle's location is determined using a global positioning system (GPS).

The Institute for Electronics and Electrical Engineers or IEEE, is a professional association, which among other things, publishes technology standards. Such standards include the well-known I.E.E.E. 802.11(a)-(n) standards for wireless communications protocols commonly referred to as "WI-FI."

Most homes in the United States now have WI-FI routers or access points (AP) by which WI-FI-compliant devices like laptops, tablet computers, and smart phones can send and receive information over the Internet. In addition to homes, many motor vehicles are now being manufactured with WI-FI compliant devices. It is expected that vehicles will also be able to provide WI-FI "access points" or "hot spots" in the near future. When a WI-FI-equipped vehicle is configured to operate with a pre-determined, i.e., known-in-advance access point, the mobile WI-FI station in the vehicle can be programmed to automatically detect and register with the access point whenever the vehicle is within the signal range of the access point and the access point is within the signal range of the vehicle's WI-FI transceiver.

WI-FI signals are able to propagate over a relatively short distance. The detection of a service set identifier (SSID) transmitted from a WLAN AP known to be located at or near a home location for the vehicle can therefore be used to determine how far the vehicle is from the AP and the home location.

Figure 1:
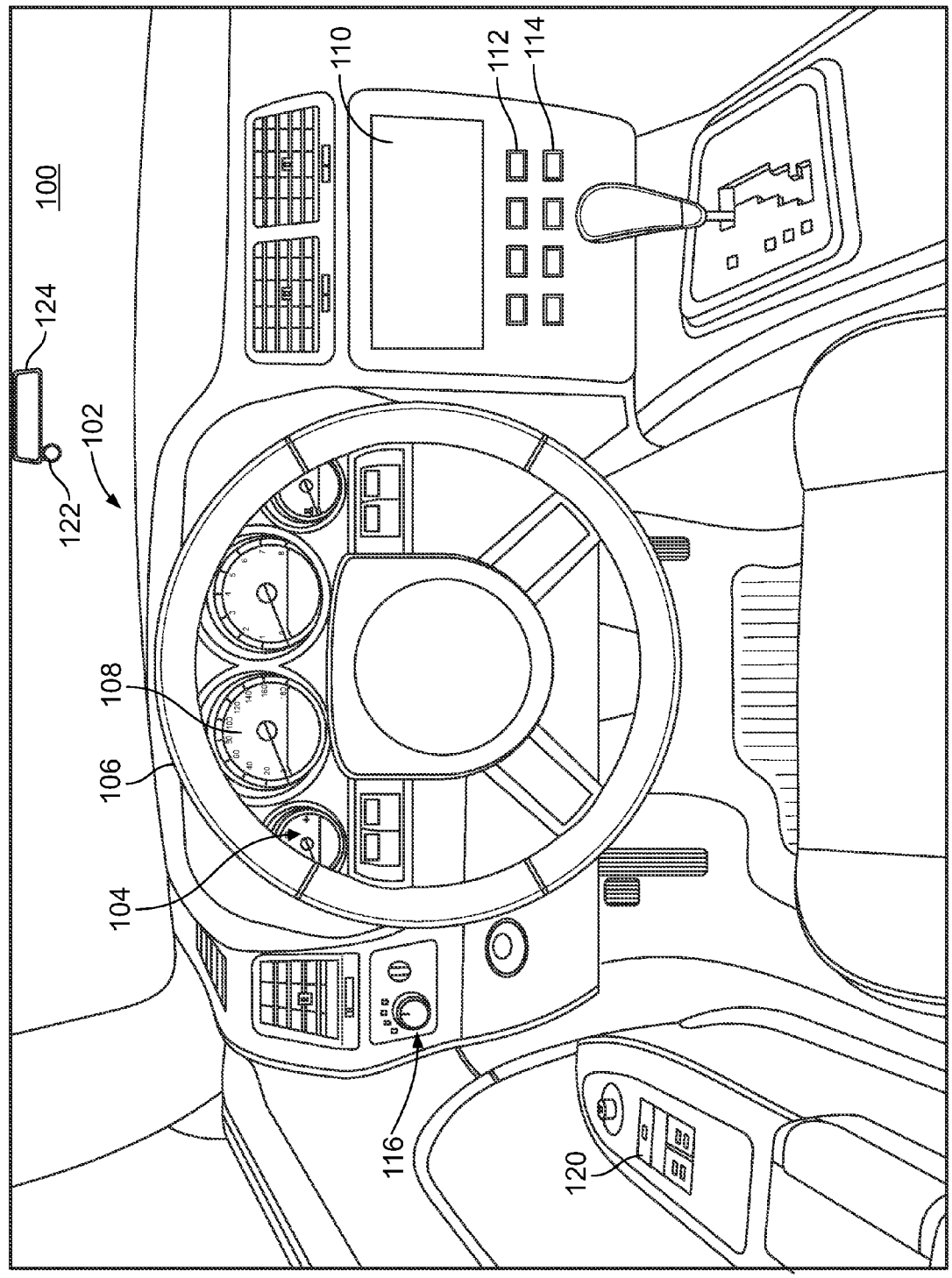
FIG. 1 depicts a vehicle dashboard.

FIG. 1 depicts a vehicle dashboard 100 and a few of the many controls and displays provided to a driver but which can distract or even overwhelm a driver. Some of the various instrument gauges 104, 106, and 108 that are provided on most vehicles can be seen in front of the steering wheel. They provide information to a driver regarding the vehicle.

Just to the right of the steering wheel is a touch-sensitive display screen 110, which is able to provide additional information to and receive tactile inputs from a driver and/or front-seat passenger. Push buttons/softkeys 112, 114 just below the touch sensitive display screen 112, are configured to enable a driver and/or passenger to operate a navigation system or entertainment system. The display screen 112, which is sometimes referred to as a "head unit," provides navigation assistance or a user interface to an "infotainment" system. Head lamp controls 116 and window and seat controls 120 are located on the left side of the steering wheel.

In addition to the foregoing controls, which are now standard equipment on most vehicles, many vehicles are now manufactured to include low-power radio frequency transmitters that are configured to work with various garage door openers. Such devices are well known to transmit a low-power signal responsive to actuation of a push button switch. The signal that is transmitted usually carries or includes a rolling digital code, which when received by a radio frequency receiver that has been "mated" to the transmitter, causes a motor-driven mechanism to be actuated, which will open a garage door thereby allowing a vehicle to be driven into or out of a garage without requiring the driver to manually open and close a garage door. A driver is thus able to remotely open and close a garage door from inside a vehicle simply by actuating a pushbutton inside the vehicle.

Many garage door openers are now also able to control lighting, security alarms, and lighting inside a building. Because many garage door openers are now also able to control other devices, such devices are referred to herein as "wireless device controllers." The terms, "wireless device controller" and "garage door opener" are thus used interchangeably.

As used herein, the term "home location" refers to a geographic location where a motor vehicle is kept in or near a garage or garage-like structure or parking lot having a door or gate, which can be remotely controlled or operated, i.e., opened and closed, using a wireless device controller. The term "home location" includes a location where devices such as lights or a security system can be controlled by a wireless device controller.

For purposes of this disclosure, a home location also has a (WLAN) access point (AP), compliant with the I.E.E.E. 802.11(a)-(n) specifications, which are incorporated by reference herein. As is known, a WLAN AP at a home location transmits its "service set identifier" or "SSID" on one or more radio frequencies such that a mobile station within signal range of the transmission will "hear" the AP's signal, detect and recognize the SSID, and thereafter associate itself with the AP, whenever a mobile station associated with the AP is within range of the AP's signal.

In FIG. 1, reference numeral 122 identifies the location of a push button for a wireless device controller, e.g., a wireless garage door opener, which is also referred to hereinafter as the user-interface for the wireless device controller. As shown in the figure, the user interface is located on a rear view mirror 124. In many vehicles, however, the user interface for a wireless device controller will be located on an overhead console, not shown in FIG. 1 but well known in the art.

Figure 2:
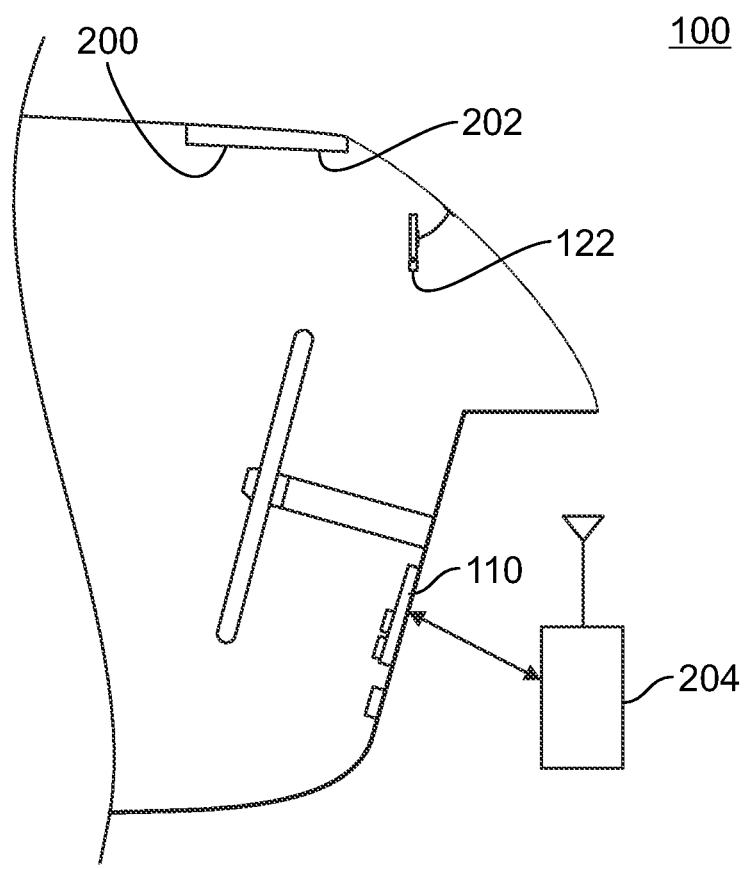
FIG. 2 is a side view of the dashboard shown in FIG. 1.

FIG. 2 is a side view of the dashboard 100 shown in FIG. 1 but additionally showing an overhead console 200 having a user interface 202 for a wireless device controller. FIG. 2 also schematically depicts a wireless device controller 204 broadcasting a signal encoded with a digital rolling code, required to open a garage door at a home location.

Figure 3:
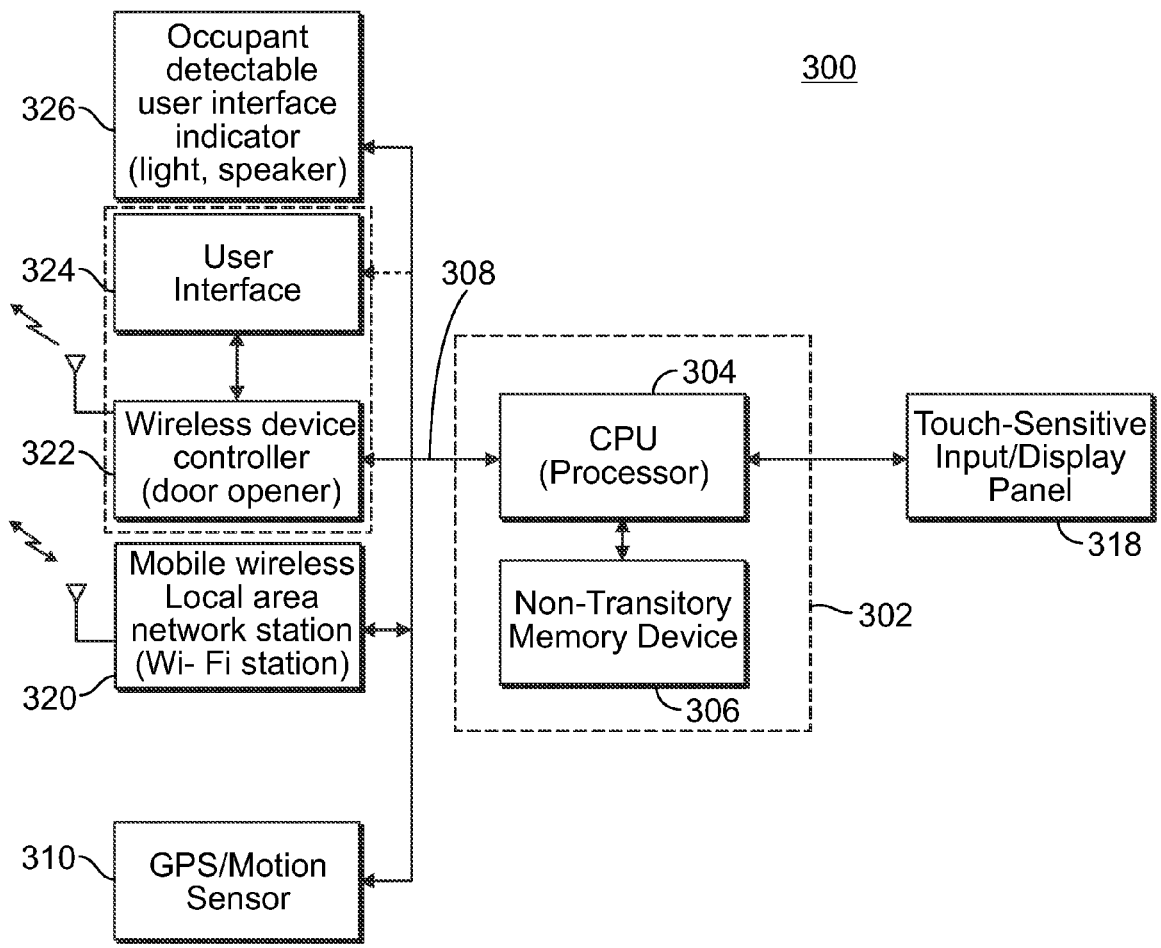
FIG. 3 depicts an apparatus for simple and reliable home location detection.

FIG. 3 depicts an apparatus 300 for a simple and reliable home location detection apparatus. A computer 302, comprising a processor 304 and non-transitory memory device 306, is operatively coupled to various peripheral devices described below, via a conventional address/data/control bus 308, which also couples the processor 304 and memory device 306 to each other. The memory device 306 stores executable program instructions for the processor 304, which are pre-determined such that when they are executed by the processor 304, they cause the processor to exercise control over the peripheral devices.

The peripheral devices operatively coupled to the computer 302 include, but are not limited to, a touch-sensitive display screen 318. Program instructions enable the processor 304 to generate images, text and icons, on the display screen 318. Other instructions enable the processor 304 to sense or read tactile input from the display screen 318. The stored instructions thus enable the display of information and the receipt of inputs by which a drive or passenger can interact with or control other devices coupled to the processor 304. Such other devices include a global positioning system (GPS) 310, a mobile wireless local area network station (WI-FI station) 320 configured to work with a pre-determined access point (AP) for a wireless local area network (WLAN) at a home location and a wireless device controller 322 having a user interface 324 (typically a push button) and an illumination device 326 for the wireless controller's user interface 324. The wireless device controller 322 and mobile WI-FI station 320 are separate devices and use different portions of the radio frequency spectrum.

The illumination device for the wireless device controller, also known as a wireless garage door opener, may be embodied as a light emitting diode (LED) located in a pushbutton or near the user interface 324. Its illumination state can help a driver locate the user interface at night but more importantly, when the illumination device is on, it's "on" status indicates that the vehicle and the wireless device controller 322 are close enough to a home location that the signal transmitted by actuating the user interface 324 of the wireless device controller 322 will be received by the controlled device, e.g., the garage door opener, at the home location. Stated another way, when the illumination device for the remote garage door opener is "on," the vehicle and its wireless garage door opener are within the signal range of the wireless garage door opener located in the vehicle. The selective illumination of a user interface 324 for wireless device controller 322 thus depends on detecting when the vehicle is within the signal range of the wireless device controller 322. Since the signal range of the wireless device controller 322 is similar to the signal range of a WLAN AP, the detection of a WLAN AP at the home location can be used as a trigger or event, which triggers the illumination of the user interface 324 of the wireless device controller 322.

Figure 4:
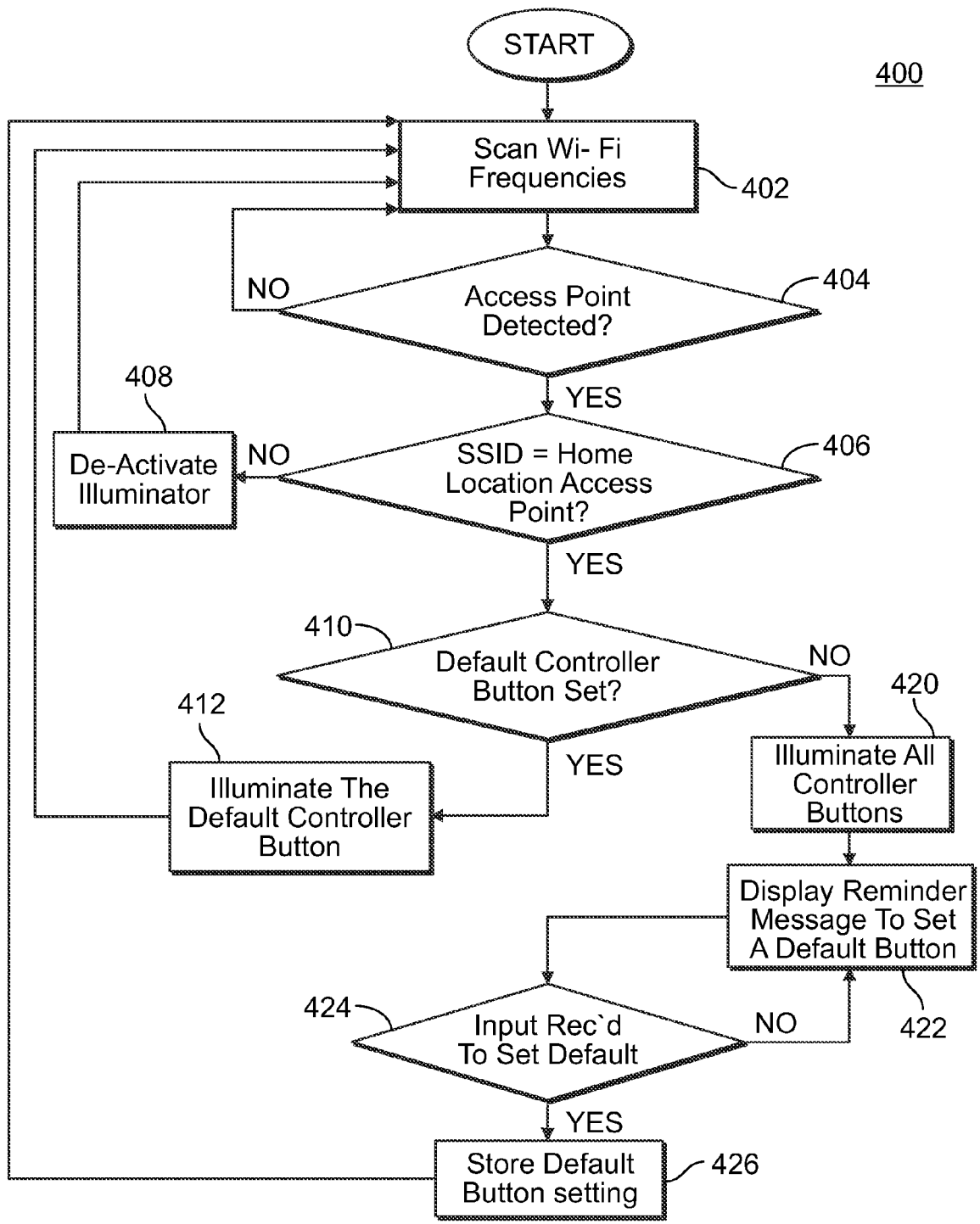
FIG. 4 depicts steps of a first method to simply and reliably identify a home location.

FIG. 4 depicts steps of a first method 400 to simply and reliably identify a home location wirelessly using the signal broadcast from a wireless local area network (WLAN) access point (AP). The method presupposes that the transmission range for a wireless control device is known in advance and therefore predetermined. The transmission range is stored in a non-volatile memory device typically part of a GPS.

At step 402, the frequencies allocated for use by I.E.E.E. 802.11(a)-(n) WLANs are scanned by a WI-FI station, which is on the vehicle. If an access point (AP) is detected by the on-vehicle WI-FI station, as shown at step 404, a determination is made at step 406 as to whether the service set identifier (SSID) for the detected AP is the SSID of the WLAN for the home location. If the SSID for a detected AP is not that of the home location for the vehicle, as determined at step 406, any previously-activated indicator of a wireless control device is deactivated or shut off at step 408. If no indicator is active, step 408 is skipped. The method 400 is thus able to deactivate a previously-activated indicator for a wireless control device, as might happen when a WI-FI station on a vehicle detects an access point for the home location, illuminates an indicator as indicated in steps following step 408, but thereafter moves away from the home location access point.

After a previously activated indicator is de-activated in step 408, the method 400 returns to step 402 to scan WLAN frequencies. The method 400 loops through steps 402, 404, and 406 until an access point for the home location is detected by the WI-FI station on the vehicle.

When a service set identifier (SSID) for the home location is detected at step 404 and determined to be the SSID for the home location at step 406, the distance to the home location is essentially known, due to the fact that the transmission range of an I.E.E.E. 802.11-compliant access point is short. Stated another way, detection of the SSID for a home location WI-FI access point essentially means that the vehicle is within a couple of hundred yards of the home location. The home location is therefore within range, or nearly within range of a wireless control device on, or in, the vehicle. The method proceeds to step 410 where a determination is made whether a default button or "user interface" for a multi-button wireless control device has been specified.

The programming of multi-button wireless control devices in a vehicle is known. Briefly, the specification of a particular button of a multi-button interface as the default is preferably made by a vehicle owner or operator during a system programming function, using commands that are input into to the computer 302. In the embodiment shown in FIG. 3, such commands are input by a user through the touch-sensitive display panel 318, which is coupled to the computer 302 by a conventional address/data/control bus. In other embodiments, commands can be input through the buttons of the multi-button interface.

In the method shown in FIG. 4, when a default button has been specified, the indicator for the default button is activated at step 412, responsive to the detection of an access point (AP) for the home location and stays on as long as the vehicle stays within range of the home location AP. If a default button or user interface has not been specified, at step 420, the method 400 depicted in FIG. 4 illuminates all of the buttons or other input devices for the wireless device controller. At step 422, a message is displayed on a display device such as the touch-sensitive input panel 318, notifying the driver to set or program a "default" button. As shown in FIG. 4, the program loops through steps 422 and 424 until a button or interface device is specified as being the default. After a default is specified at step 424, the default button setting is stored at step 426. Thereafter, the default button is illuminated at step 412 whenever the vehicle is within range of the wireless device controller as determined by the detection of a home location access point.

As stated above, the user input device for a wireless device controller may be a push button. The illumination device for a push button may be a light emitting diode (LED) located inside the push button but visible through a hole or opening in the push button through which the LED can be seen. Since the push button for a garage door opener and its illumination device may be located on a rear view mirror or overhead console, they are considered herein to be perceptible by vehicle occupants, including the driver.

Figure 5:
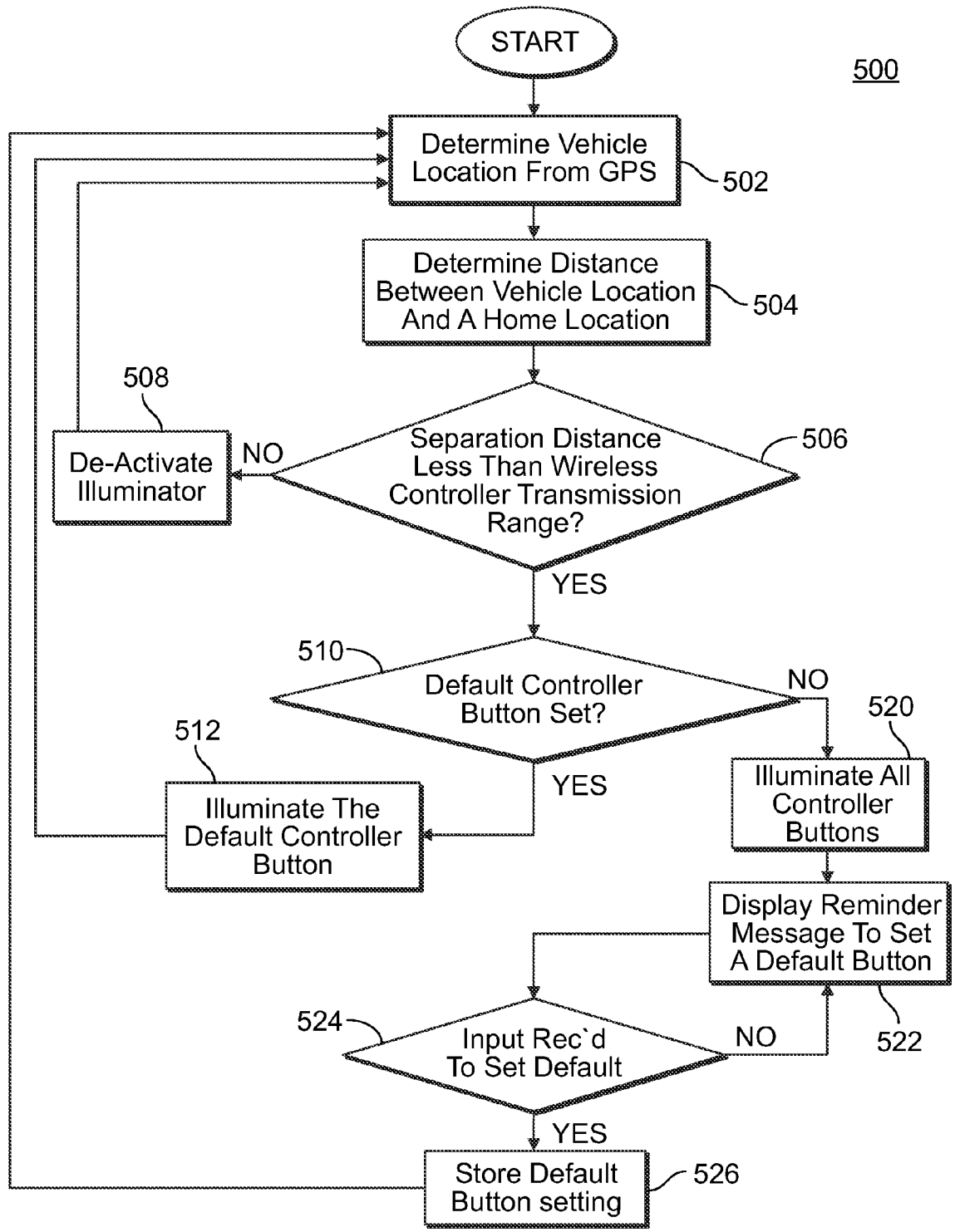
FIG. 5 depicts steps of a second method to simply and reliably identify a home location.

FIG. 5 depicts steps of a second method 500 to simply and reliably identify a home location wirelessly using only the vehicle's current location, distance to a home location and a known-in-advance maximum transmission range for the wireless device controller, e.g., a wireless garage door opener. Except for step 502, the method shown in FIG. 5 is the same as the method shown in FIG. 4.

At step 502, the vehicle's current location is determined using a GPS. Similar to step 406 and 408 described above, at step 504, the distance between the vehicle's current location and the home location is determined but using the GPS navigation system to determine the separation distance, such a distance determination being known in the art.

If the distance to the home location is greater than the transmission range of a wireless device controller, e.g., a garage door opener, an indicator for a wireless controller is de-activated or turned off at step 508. The method 500 of FIG. 5 thus loops through steps 504, 506, and 508 until the vehicle and wireless device controller come within range of a wireless access point with which the wireless device controller can associate itself.

When the vehicle and the wireless device controller carried by the vehicle come within the transmission range of a home location access point, as determined by the GPS, the method 500 of FIG. 5 proceeds to step 510 where a determination is made whether a multi-button wireless device controller, i.e., a multi-button garage door opener, has a button that has been assigned or programmed to be a "default" button. If so, the method proceeds to step 512 where the default button is illuminated. The method 500 thereafter loops through steps 502-512.

If a default button for a multi-button wireless device controller has not been specified, the method 500 proceeds to step 520, at which all of the buttons are illuminated and a message displayed on a display device at step 522, which reminds the vehicle occupants including the driver to set a button to be a default button. The reminder message is maintained on the display device until an input is received at step 524.

After a driver or other occupant programs or sets a particular button of a multi-button opener to be the default button, the identity of that button is stored at step 526 and the method steps 502-512 are repeated as needed.

In one embodiment, the wireless device controller is configured to control a garage door opener at a home location. In an alternate embodiment, the wireless device controller is configured to also control lighting and an alarm at the home location. In such an embodiment, the wireless device controller is provided corresponding user interfaces, e.g., one or more push buttons and associated LEDs, the illumination state of which indicates whether the wireless device controller is close enough to the home location such that activation of an illuminated user interface will cause transmission of a signal that will be received by a corresponding device to be controlled.

The foregoing description is for purposes of illustration. The true scope of the invention is set forth in the following claims.

The invention claimed is:

1. A method of detecting a home location in a motor vehicle having a mobile wireless station configured to communicate with a predetermined wireless access point, and activating an indicator for a wireless device controller, said motor vehicle having a multi-button wireless control device, the method comprising:
   determining a location of the vehicle using a navigation system;
   determining a distance between the vehicle's location and the home location, using said navigation system;
   determining whether the distance between the vehicle's location and the home location is less than a transmission range of the multi-button wireless device controller, which is coupled to the vehicle, the multi-button wireless device controller capable of being configured to wirelessly control a device at the home location;
   determining whether a particular button of the multi-button wireless control device has been assigned to open a garage door at the home location;
   if the distance between the location of vehicle and the home location is less than the transmission range of the multi-button wireless device controller, and if no particular button of the multi-button wireless control device has been assigned to open a garage door at the home location, illuminating all of the buttons of the multi-button wireless control device and, displaying a message on a display device notifying occupants of the vehicle to set a particular button of the multi-button wireless control device as a default button for the garage door at the home location;
   receiving a selection of a particular button to thereafter be the default button; and
   activating an indicator for the selected default button, responsive to a determination by the processor that the distance between the location of vehicle and the home location is less than the transmission range of the wireless device controller.

2. The method of claim 1, wherein the indicator device is a light source in the selected default button and wherein the multi-button wireless controller is configured to wirelessly actuate a device at the home location by transmission of a predetermined radio frequency signal, which is transmitted by the multi-button wireless controller responsive to an occupant's actuation of an interface device for the wireless controller.

3. The method of claim 2, wherein the multi-button wireless controller is configured to wirelessly control at least one of a plurality of devices at the home location and wherein the multi-button wireless controller comprises a plurality of interfaces, actuation of each interface being able to control the operation of a corresponding device at the home location.

4. The method of claim 2, further including the step of de-activating the light source responsive to a determination that the distance between the location of the vehicle and the home location is greater than the transmission range of the wireless device controller.

5. An apparatus for detecting a home location in a motor vehicle having a mobile wireless station that is configured to communicate with a predetermined wireless access point, the apparatus being located in the vehicle and comprising:
- a navigation device;
- an I.E.E.E. 802.11-compliant mobile wireless station configured to communicate with a predetermined access point for a predetermined wireless local area network;
- a multi-button wireless device controller configured to remotely control a device inside the home location by transmission of a radio frequency signal, the multi-button wireless device controller having a plurality of push buttons the actuation of which causes the transmission of a radio frequency signal from the multi-button wireless device controller;
- a plurality of lights, at least one light being proximate to each push button of the plurality of push buttons, the at least one light proximate to each push button being configured to at least partially illuminate the proximate push button and thereby identify the proximate push button; and
- a processor, operatively coupled to the navigation device, mobile wireless station, wireless device controller, the lights and coupled to a non-transitory memory device, the non-transitory memory device storing program instructions, which when executed cause the processor to:
- determine a distance between a vehicle's current location and a home location using said navigation device;
- control the mobile wireless station to monitor a predetermined frequency for the presence of a predetermined signal;
- determine whether a particular push button of the multi-button wireless control device has been assigned to open a garage door at the home location;
- if the distance between the location of vehicle and the home location is less than the transmission range of the multi-button wireless device controller, and if no button of the multi-button wireless control device has been assigned to open a garage door at the home location, illuminating the lights proximate to the buttons of the multi-button wireless control device and, displaying a message on a display device notifying occupants of the vehicle to set a particular button of the multi-button wireless control device as a default button for the garage door at the home location;
- receive a selection of a particular button to thereafter be the default button; and
- activate the light for the selected default button responsive to a determination that the distance between the vehicle's current location and home location is less than the transmission range of the signal transmitted from the wireless device controller.

6. The apparatus of claim 5, wherein the mobile wireless station is configured to transmit and receive radio frequency signals in a first portion of the radio frequency spectrum and wherein the wireless device controller is configured to transmit radio frequency signal in a second portion of the radio frequency spectrum.

* * * * *